June 9, 1931. B. COLBJÖRNSEN 1,809,473
METHOD OF TREATING REACTION PRODUCTS OF PHOSPHATES AND SULPHURIC ACID
Filed Jan. 21, 1927
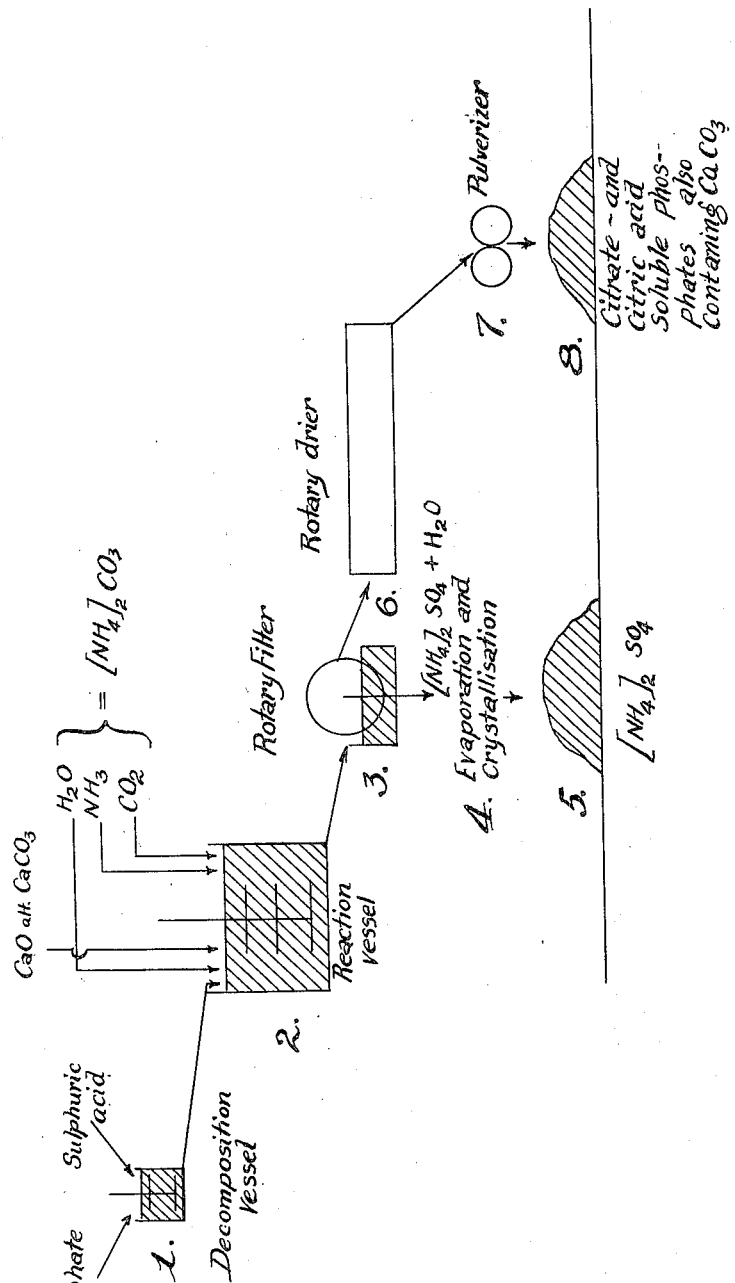
INVENTOR.
B. Colbjornsen Patented June 9, 1931

1,809,473

UNITED STATES PATENT OFFICE

BJARNE COLBJÖRNSEN, OF GADDVIKEN, NEAR STOCKHOLM, SWEDEN

METHOD OF TREATING REACTION PRODUCTS OF PHOSPHATES AND SULPHURIC ACID

Application filed January 21, 1927, Serial No. 162,685, and in Sweden January 23, 1926.

It is previously known, that on decomposing raw phosphates with sulphuric acid, it is possible to conduct the reaction in such a way, that gypsum and monocalcium phosphate are formed according to the formula:

1. $Ca_3(PO_4)_2 + 2H_2SO_4 = 2CaSO_4 + CaH_4(PO_4)_2$.

The sulphuric acid used will then be lost and the monocalcium phosphate becomes mixed with gypsum.

The present invention has for its object a method of treating raw phosphates or substances containing phosphates (superphosphate), which have previously been decomposed with sulphuric acid, so that phosphates are obtained, which are soluble in citrate and in citric acid solutions at the same time as the sulphuric acid used in the treatment can be wholly or partially recovered.

According to the present invention the raw phosphates, having been decomposed in the above mentioned manner, are treated in the form of a suspension with ammonium carbonate or with ammonia and carbon dioxide suitably at a temperature of about 40° C. and preferably during a time of 4–6 hours under stirring. By this means some one of the reactions 2 or 3 or a combination of both will take place, dependent on the reaction temperature, the quantity of ammonium carbonate added and on the length of the time of reaction:

2. $CaH_4(PO_4)_2 + 2CaSO_4 + 2(NH_4)_2CO_3 = 2CaHPO_4 + 2(NH_4)_2SO_4 + CO_2 + H_2O + CaCO_3$.

3. $CaH_4(PO_4)_2 + 2CaSO_4 + 2(NH_4)_2CO_3 = Ca_3(PO_4)_2 + 2(NH_4)_2SO_4 + 2CO_2 + 2H_2O$.

According to the reaction 2 dicalcium phosphate, calcium carbonate and ammonium sulphate are thus formed and the raw phosphate is consequently transformed into a phosphate, which is soluble in citrate and citric acid solutions and is assimilable for plants, at the same time as the sulphuric acid, which has been used in decomposing the raw phosphate, is recovered in the form of ammonium sulphate.

According to the reaction 3 tricalcium phosphate and ammonium sulphate are formed in a similar manner. It is, however, to be observed, that the tricalcium phosphate obtained in this manner is almost perfectly soluble in a 2% citric acid solution according to Wagner, and its value as a manure is about the same as or better than that of ordinary Thomas or Rhenania phosphate.

After the reactions 2 or 3 have been completed, the precipitate of di- or tricalcium phosphate, and it may be also calcium carbonate, is filtered from the solution of ammonium sulphate, which latter can be treated in any known manner for recovering a solid crystallized ammonium sulphate. The phosphate-precipitates are dried and pulverized, whereafter they are ready to be used as a phosphoric acid manure.

There are, however, other methods of treating raw phosphates, having been decomposed with sulphuric acid, with ammonium carbonate according to the present invention, without departing from the principal characteristics of the reactions 2 and 3.

Thus, one may also, after the reaction 1 has been completed, treat the reaction product with lime milk or lime stone powder, so that dicalcium phosphate is formed in a known manner according to the formula:

4. $2CaSO_4 + CaH_4(PO_4)_2 + CaO = 2CaSO_4 + 2CaHPO_4 + H_2O$.

The precipitate obtained in this manner and consisting of dicalcium phosphate and gypsum is then treated as set forth above with ammonium carbonates or with ammonia and carbon dioxide in such a quantity, that the following reaction principally takes place:

5. $2CaSO_4 + 2CaHPO_4 + 2(NH_4)_2CO_3 = 2CaHPO_4 + 2CaCO_3 + 2(NH_4)_2SO_4$.

The dicalcium phosphate formed according to the reaction 4 is left substantially unattacked according to the reaction 5, while the sulphuric acid, which has been used for decomposing the raw phosphate, is still recovered in the form of ammonium sulphate, which can be recovered in any known manner.

The accompanying drawing shows diagrammatically a "flow-sheet" in which 1 designates the decomposition vessel, where phosphate rock and sulphuric acid are added. 2 is the reaction vessel, where the reactions indicated on the sketch are executed. 3 is a rotary filter, where $(NH_4)_2SO_4 + H_2O$ is separated and evaporated at 4 and stored up as $(NH_4)_2SO_4$ at 5.

The phosphates are carried over from the rotary filter 3 to the rotary drier 6 and pass therefrom to the pulverizer 7, where the phosphates are pulverized and stored up at 8.

Further advantages, which are or can be gained in applying the above described methods, are amongst others the following:

According to the reactions 2, 3 and 5 the gypsum formed when the sulphuric acid reacts with the raw phosphates and which in ordinary cases would dilute the final product, is replaced by calcium carbonate. This is advantageous, since the calcium carbonate, besides being easier to separate by filtration than the gypsum, also has a considerably lower molecular weight ($CaCO_3 = 100$, $CaSO_4 2aq = 172.2$). This means, that the phosphate-precipitate obtained, for instance according to the reaction 2, will contain a considerably higher percentage of $P_2O_5$ than that of the starting material.

On starting from a raw phosphate, which according to earlier methods would for instance give a 20% superphosphate, it will according to the present invention be possible to obtain, by working according to the reactions 1, 2 and 3, a product containing about 33% of phosphoric acid soluble in citrate and citric acid solution. On starting from a raw phosphate of a considerably lower percentage, which according to the ordinary method of manufacturing superphosphate, would give for instance a 14% superphosphate, it will be possible according to the present invention to obtain a product containing about 24% of assimilable phosphoric acid.

Moreover, the advantage is gained according to the present invention, that it is possible to start without inconvenience from such raw phosphates, which due to their content of iron and alumina cannot be used according to the known methods for manufacturing superphosphate due to the fact, that the iron and aluminum phosphates formed revert the superphosphate during the storage of the product. The phosphate-precipitates formed according to this invention are namely completely neutral and dry bodies, in which no secondary reactions take place during the storage.

Moreover, the present invention makes it possible to utilize raw phosphates containing so large quantities of carbonate, that they, due to the great consumption of sulphuric acid caused by said carbonates, cannot from economical reasons be used for manufacturing superphosphate according to the known methods. According to the present invention, however, this great consumption of sulphuric acid is of no importance, as the sulphuric acid is recovered.

As to the ammonium sulphate formed it may be observed, that the same is obtained in a completely neutral form, as it is recovered from a feebly alkaline solution. Ammonium sulphate manufactured in the ordinary manner by neutralizing sulphuric acid with ammonia always contains traces of free sulphuric acid, which has an unfavourable action during the storage of the same, since the ammonium sulphate thereby has a tendency of "caking", and, moreover, the free sulphuric acid has a corrosive action on the packing during the storage or transportation of the ammonium sulphate.

As will be clear from the foregoing it is easy to establish the conditions of reaction, necessary for the practical execution of the present method.

The decomposition of raw phosphates with sulphuric acid is a process, which is known long ago and which has been seriously investigated. According to this invention the treatment of the product of said decomposition with ammonium carbonates or with ammonia and carbon dioxide takes place at the temperature of only about 40° C., at which temperature the different reactions are carried out very easily and completely and can be completed during a time of 4–6 hours. The filtering off of the phosphate-precipitates also takes place very easily as distinguished from the filtration in the presence of gypsum, and from this reason said precipitates can easily be washed.

However, by working according to some one of the above mentioned methods the ammonium sulphate is obtained in the form of a solution, which must be evaporated in order that the ammonium sulphate should be obtained in a solid form.

Now the inventor has found, that by using an ammonium sulphate solution, which is saturated at for instance 20° C., as a carrier for the ammonium carbonate, the reactions will nevertheless take place both easily and completely. During the course of the reactions there are then formed further quantities of ammonium sulphate, which at the reaction temperature of about 40° C. will partially be dissolved and partially precipitated together with the phosphate-precipitates. If therefore, after the treatment is completed, the temperature of the mass is rapidly raised up to about 80° C. the previously precipitated ammonium sulphate will also be dissolved, so that after filtration at an elevated temperature, and when the solution is thereafter cooled, the ammonium sulphate will precipitate and is then obtained in a very pure form. The mother liquor, which is filtered off, is thereafter again used as a carrier for new quantities of ammonium carbonates and it is only necessary to evaporate the water used for washing the phosphate-precipitates in order to recover ammonium sulphate therefrom.

However, if it is desired to obtain directly a mixture of ammonium sulphate and phosphate soluble in citrate and citric acid solutions, it is preferable to work in such a manner, that after the treatment with ammonium carbonate or ammonia and carbon dioxide one does not heat the reacting mass but permits the new formed ammonium sulphate to remain mixed with the phosphate-precipitates in such a manner, that by filtering the reacting mass the ammonium sulphate, which is in solution, is separated from the solid ammonium sulphate, which remains in the phosphate-precipitates. The mixture of phosphate and ammonium sulphate can then be dried, so as to directly obtain an intimate mixture of ammonium sulphate and phosphate, which is soluble in citrate and citric acid solutions. By suitably adapting the temperature, at which the filtration takes place, it will thus be possible to cause a greater or smaller quantity of ammonium sulphate to remain in the phosphate precipitate. In this manner it will thus easily be possible to obtain any desired proportion between nitrogen and phosphoric acid in the final product.

In the accompanying drawing is shown the flow sheet representing the carrying out of the method.

I claim:

1. Method of treating raw phosphates decomposed by sulphuric acid, which comprises treating the decomposition product with water so as to partially dissolve and partially suspend the same, precipitating dicalcium phosphate therefrom, supplying ammonia and carbon dioxide thereto, separating the insoluble calcium salts from the solution and heating said solution so as to recover ammonium sulphate.

2. Method of treating raw phosphates decomposed by sulphuric acid, which comprises treating the decomposition product with water so as to partially dissolve and partially suspend the same, precipitating dicalcium phosphate therefrom, using milk of lime as precipitant, supplying ammonia and carbon dioxide thereto, separating the insoluble calcium salts from the solution and heating said solution so as to recover ammonium sulphate.

3. Method of treating raw phosphates decomposed by sulphuric acid, which comprises treating the decomposition product with water so as to partially dissolve and partially suspend the same, precipitating dicalcium phosphate therefrom, using calcium carbonate as precipitant, supplying ammonia and carbon dioxide thereto, separating the insoluble calcium salts from the solution and heating said solution so as to recover ammonium sulphate.

In testimony whereof I have hereunto affixed my signature.

BJARNE COLBJÖRNSEN.